Aug. 30, 1960  F. W. SEYBOLD  2,950,631
AUTOMATIC TRANSMISSION
Filed Feb. 26, 1959
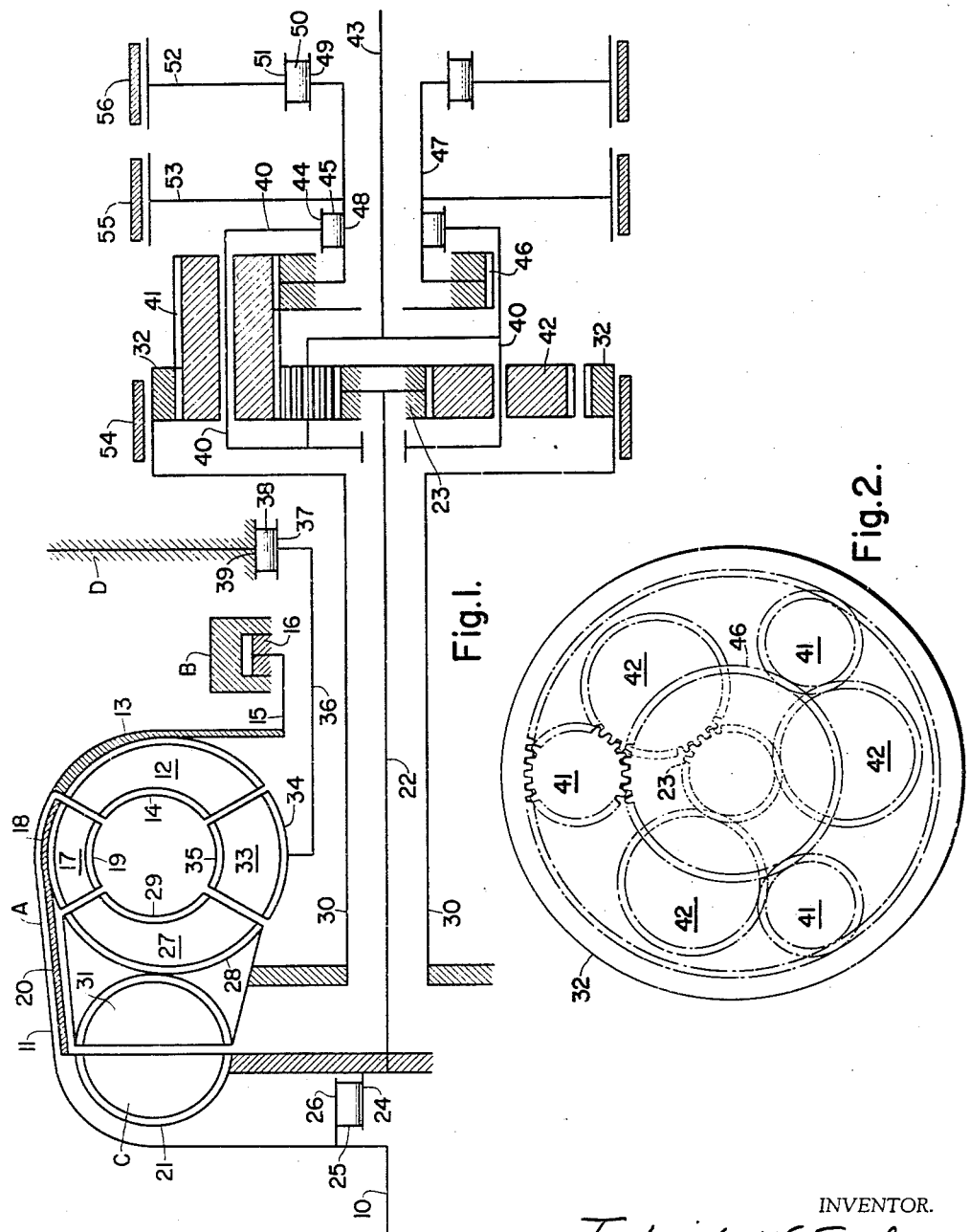
INVENTOR.
Frederick W. Seybold

2,950,631
AUTOMATIC TRANSMISSION

Frederick W. Seybold, 1979 Dogwood Drive,
Scotch Plains, N.J.

Filed Feb. 26, 1959, Ser. No. 795,842

12 Claims. (Cl. 74—677)

This invention pertains to automatic power transmitting devices and particularly to those used with internal combustion engines or other applications that require variable speed and torque ratios. Such devices as referred to above are usually mounted between the engine and the shaft which drives the wheels of passenger cars, trucks, buses or military tanks and for other power transmission applications where multiplied torque for starting such vehicles from rest and thereafter bringing them into direct drive ratio are required.

Today there are in use various combinations of fluid drives and planetary gear sets which are controlled by a governor and accelerator actuated valve which directs pressure oil to control elements consisting of clutches, fluid couplings and brakes to produce the various speed and torque ratios. In transmissions which utilize a fluid coupling in place of a multiple plate clutch this coupling must be filled and emptied alternately and this must be done in a fraction of a second.

On others of these transmissions a rather precise timing between the application and/or release of these control elements is required so that a minimum of shock is felt by the passengers of the vehicles in which such transmissions are installed. Furthermore these complicated hydraulic circuits are subject to malfunction and they are also expensive to manufacture.

Having these shortcomings in mind, it is a primary object of the present invention to provide the combination of a multiple turbine torque converter joined with a fluid coupling and a geared unit in a transmission characterized by its extreme simplicity and smoothness of operation.

A further object of this invention is to provide an automatic variable speed transmission which develops a high starting torque and in which the output torque progressively diminishes with an increase in car speed and which is capable of passing smoothly into the direct drive condition without benefit of a governor, solenoid, direct drive clutch or the manipulation of other control elements.

An additional object of this invention is to provide means enabling the transmission to make the transition from a lower speed ratio into the direct drive ratio without perceptible shock, said means being a fluid coupling which remains filled at all times in all of its speed ratios.

Another object of this invention is to provide means for maintaining the transmission in an underdrive ratio and over-rule its capacity to pass into the direct drive condition, this means is to be employed for hill braking or passing another vehicle in traffic.

This invention also includes the feature of utilizing the same gears for reverse operation and the provision of a hill-holding device which becomes automatically ineffective when the transmission is conditioned for reverse operation. This hill-holding device also performs a useful service when it becomes necessary to push-start the engine, as it provides a direct mechanical drive connection from the rear wheels of the vehicle to the engine crank shaft.

The above objects and advantages will become apparent when reference is made to the following description taken in connection with the accompanying drawing, in which:

Figure 1 is a vertical, longitudinal section through a power transmission constructed according to my invention;

Figure 2 is a diagram of the pitch circles of the planetary gearing shown in Figure 1.

GENERAL ARRANGEMENT

In general, this transmission comprises the combination of a multiple turbine torque converter, a fluid coupling and an interconnected planetary gearing arrangement controlled by brakes, whereby a high starting torque is provided for the rapid acceleration of a motor vehicle from standstill in either direction of motion. The transmission is also capable through its own progressive action to produce a continuously decreasing torque with an increase in speed and finally pass into the direct drive ratio without shock.

The converter comprises a pump member driven by the engine. The fluid discharged by the first turbine, which it received from the pump, impinges on the blades of the second turbine member, the latter being connected to the ring gear of the planetary gearing. The fluid discharged from the second turbine enters the stator element whose blades are shaped so that the fluid discharged from the stator enters the blades of the pump with a minimum of shock. The stator is operatively connected to a one-way brake which prevents its backward rotation while permitting it to rotate in the forward direction.

The planetary gearing comprises further a pair of sun gears, one of which is connected to the first turbine and the other sun gear is provided with means for braking it directly in either direction or only in the reverse direction of rotation, while permitting its free rotation forwardly. The planetary gearing comprises further a planetay pinion carrier which is connected to the output shaft of the transmission.

On this carrier are mounted several long planet pinions which mesh with the ring gear and the sun gear equipped with the braking means. Additional planet pinions are mounted on the carrier which mesh with the long pinions and the sun gear which is connected to the first turbine.

An overrunning clutch is also provided whereby driving torque can be transmitted from the first turbine and its connected sun gear to the engine drive shaft.

Another overrunning clutch is interposed between the carrier and the brake means associated with the sun gear whereby reverse rotation of the output shaft is prevented when the transmission is conditioned for forward operation.

A two-element fluid coupling of suitable size is positioned in the converter housing, one element of said coupling being connected to the first turbine, while the other element is connected to the second turbine of the hydraulic torque converter previously described.

The speed ratio between the first and second turbine elements is, of course, determined by the gear proportions of the planetary gearing. The second turbine rotates at less than one-half the speed of the first turbine at starting. The fluid pumped by the impeller is thrown against the blades of the second turbine producing a backward thrust which is transmitted to its ring gear.

Forward rotation of the first turbine and its connected sun gear will produce a reverse rotation of the other sun gear which, however, is prevented when either or both brake elements associated with said sun gear are applied.

As the vehicle gains in speed the speed of rotation of the first turbine element will approach that of the drive shaft and pump and all the fluid torque will thereafter be delivered by the second turbine to its ring gear, the fluid discharged from the first turbine having attained a more and more favorable entrance angle into the second turbine as the first turbine increases its speed relative to the pump.

A further rise in engine and vehicle speed will bring about the condition whereby the first turbine attains the speed of the drive shaft but cannot exceed it, being prevented by the previously mentioned overrunning clutch which is capable of transmitting torque from the first turbine and its connected sun gear to the engine drive shaft.

All the engine driving torque is now multiplied in the converter only, the sun gear which serves as the reaction member of the planetary gear arrangement will begin to rotate forwardly and cease its torque multiplying function. The torque delivered to the ring gear is divided between the carrier and the sun gear connected to the first turbine, the larger portion going to the carrier and output shaft and the portion received by the sun gear is "fed back" through the fluid coupling to the ring gear.

The speed of the first turbine and its sun gear now being equal to that of the drive shaft, consequently the impeller of the fluid coupling being connected to the first turbine will rotate faster than the runner of the coupling which is connected to the second turbine.

Gradually, however, both elements of the fluid coupling will attain approximately the same speed and direct drive ratio will then be established.

Reverse operation of the transmission is secured by applying a brake band to a brake drum integral with the ring gear, the brake means associated with the sun gear being in their released condition.

STRUCTURAL ARRANGEMENT

The transmisison illustrated in Figure 1 may best be understood by dividing it into seven assemblies.

1. *The driving assembly*

The driving assembly comprises the drive shaft 10 which is connected to the casing 11 of the hydro-kinetic device A. Curved blades 12 are equally spaced between outer shell 13 and inner shell 14 forming the pump or impeller of the torque converter. A hub 15 is attached to shell 13 and it extends into the stationary pump casing B, and a pinion 16 is fastened to said hub. Pinion 16 meshes with an eccentrically positioned internal gear, thereby forming a well-known pump arrangement for supplying pressure oil for the operation of the transmission control elements.

2. *The first turbine assembly*

The first turbine assembly consists of the blades 17 mounted in the toroidal shell 18 and inner shell 19. Outer shell 18 has an extension 20 which connects with the impeller 21 of the fluid coupling C. Impeller 21 is connected to the long shaft 22 to the right extremity of which is attached the sun pinion 23. The left extremity of shaft 22 carries the inner race 24 of a Form-sprag or overrunning clutch 25, while the race 26 is secured to the drive shaft 10.

3. *The second turbine assembly*

The second turbine assembly consists of the blades 27 mounted between outer shell 28 and inner shell 29 and it is connected to the left extremity of the tubular shaft 30. The runner 31 of the fluid coupling C is also connected to the second turbine element. The right extremity of the tubular shaft 30 is connected to the web of the internally toothed ring gear 32.

4. *The stator assembly*

The stator assembly comprises the vaned elements 33 mounted between outer shell 34 and inner shell 35. Shell 34 is connected to a tubular shaft 36 to which inner race 37 of the overrunning brake 38 is attached, while the outer race 39 thereof is secured to the transmission casing D.

5. *The driven assembly*

The driven assembly comprises the planetary pinion carrier 40 on which are mounted the long planetary pinions 41 and the shorter pinions 42, the latter meshing with the long pinions 41 and the sun gear 23. The long pinions 41 also mesh with the ring gear 32. The output shaft 43 is connected to the carrier 40, the latter has also mounted thereon the outer race 44 of an overrunning brake 45.

6. *The reaction assembly*

The reaction assembly comprises the sun gear 46 which is fastened to tubular shaft 47 on which are mounted the inner race 48 of the brake 45 as well as the inner race 49 of the overrunning brake 50, whose outer race 51 is mounted in the brake drum 52. Another brake drum 53 is attached to the tubular shaft 47.

7. *The control mechanism*

The control mechanism comprises the brake bands 54, 55, and 56 cooperating respectively with ring gear drum 32, brake drum 53 and brake drum 52. Pressure oil from pump B is conducted to well-known brake applying cylinders through a valve controlled manually or automatically and this method of control being well known in the art it is not a part of this invention.

OPERATION

A. *Idling or "neutral" operation*

When the vehicle brakes are applied with the engine idling and all control devices of the transmission in their released setting, as shown in Figure 1, the driven shaft 43 remains stationary. For the purpose of illustrating the design of a transmission embodying this invention the following gear proportions have been chosen:

| | Teeth |
|---|---|
| Sun pinion 23 | 18 |
| Sun gear 46 | 39 |
| Planet pinion 41 | 18 |
| Planet pinion 42 | 25 |
| Ring gear 32 | 75 |

For one revolution of turbines 17 and 21 together with shaft 22 and sun pinion 23, the carrier 40 being stationary, turbines 27 and 31 together with ring gear 32 will make .240 revolution forwardly, while reaction sun gear 46 will rotate .462 revolution reversely.

B. *Forward drive operation*

With the foot brake applied the transmission control brake band 56 is applied to the brake drum 52, whereby the reaction sun gear 46 becomes stalled and the speed ratio between the second turbine 27—31 will rise from the idling ratio of .240 to .480.

The speed ratio of the carrier 40 and output shaft 43 will now be .3157 revolution for each revolution of the first turbine 17—21. For illustration, assume that the shape of the blading of torque converter A is as shown in Figures 2 and 3 of my Patent No. 2,763,163. Hence the discharged fluid from turbine 17 produces a backward thrust on the blades of the second turbine 27 at stall, as well as in the early stages of forward motion of the vehicle.

Torque multiplication in the gear set comprising sun pinion 23, planets 41 and 42 and the reaction sun gear 46 is 3.167:1 and in the converter the torque multiplication is approximately 2:1, so that the gross torque multiplication would be 6.333:1. In other words, if the engine delivers 100 forward units of torque the first turbine produces 200 forward units of torque, then the gross output torque would be 633 forward units. The second turbine, due to the backward thrust mentioned above, produces 100 reverse units of torque, and this torque is multiplied through the ring gear 32, planet pinion 41 and reaction sun gear 46 to 152 reverse units of torque, which when deducted from the gross output torque would be 481 forward units of output torque delivered to the output shaft 43. The reaction torque will, therefore be 381 reverse units.

The speed of both turbines continues to rise with increase of the engine speed, but the speed ratio between the turbines will be maintained until the speed of the first turbine equals the pump speed. As the speed of the first turbine increases relative to that of the pump the direction of fluid entrance into the second turbine becomes more and more favorable and at a certain stage it will have an entrance direction whereby a forward thrust is produced on the second turbine, while the forward thrust of the first turbine gradually decreases.

The fluid coupling C, being filled with fluid at all times, does not contribute any forward torque at stall of the converter because the turbines of the latter are not then in motion, but as soon as the speed of impeller 21 is great enough torque will be transmitted to runner 31.

When the condition is reached where the speed of the first turbine 17 equals that of the pump 12 the transmission of torque from the pump to the first turbine will cease. The overrunning clutch 25 will prevent the first turbine 17 from turning faster than the drive shaft 10. All the engine torque will now be delivered to the second turbine 27 and it will be further augmented by the stator 33 in an amount depending on the speed ratio then prevailing between the second turbine 27 and the pump 12.

At the above indicated speed ratio of .480 the torque multiplication ratio in the converter A may be 1.60 times the pump torque, hence the second turbine 27 will deliver 160 units of torque to internal gear 32 when the engine produces 100 units of torque.

It should be noted here that the sun gear 23 will receive torque from the internal gear 32 for driving the impeller 21 of the fluid coupling C, said torque being imparted to the runner 31 which is connected to internal gear 32. This torque, which has been designated as circulating or feed-back torque (F.B.T.), may be determined from the gear data as follows:

|  | Driven | Driver | Held |
|---|---|---|---|
|  | Carrier 40 | Internal gear 32 | Sun gear 46 |
|  | $\frac{1}{0}$ | $\frac{1}{+39/75}$ | $\frac{1}{-1}$ |
| Speed ratio: | 1 | 114/75=38/25 | 0 |
| Driven/Driver | 25/38 | 1 | 0 |
| (1) Torque ratio: |  |  |  |
| Driven/Driver | 38/25 | 1 | −13/25 |
|  | Driven | Driver | Held |
|  | Carrier 40 | Sun gear 23 | Sun gear 46 |
|  | $\frac{1}{0}$ | $\frac{1}{+39/18}$ | $\frac{1}{-1}$ |
|  | 1 | 57/18 | 0 |
| Speed ratio: |  |  |  |
| Driven/Driver | 6/19 | 1 | 0 |
| (2) Torque ratio: |  |  |  |
| Driven/Driver | 19/6 | 1 | −13/6 |

For simplicity the following abbreviations are made:
(3) Converter torque, C.T.=160 units
(4) Feed-back torque, F.B.T.
(5) Torque on internal gear 32, I.T.
(6) Gross torque on carrier 40=38/25 (C.T.+F.B.T.)
(7) Torque derived from carrier 40 to drive sun gear 23=19/6 F.B.T.
(8) Reaction torque on sun gear 46=Item 6−Item 5
(9) Net carrier torque=Item 6−Item 7
   160=38/25 (160+F.B.T.)−19/6 F.B.T.
   160×150=228 (160+F.B.T.)−475 F.B.T.
   24,000=36,480+228 F.B.T.−475 F.B.T.
(10) $\text{F.B.T.}=\frac{12,480}{247}=50.5$ units
(11) Torque on internal gear 32=160+50.5=210.5 units
(12) Gross torque on carrier 40=38/25×210.5=320 units
(13) Torque derived from carrier 40 to drive sun gear 23 and impeller 21=19/6×F.B.T.=19/6×50.5=160 units
(14) Reaction torque on sun gear 46=Item 12−Item 11= 109.5 units The feed-back torque, Item 10, may also be determined from the gear ratio $$\frac{\text{Sun gear 23}}{\text{Internal gear 32}}=\frac{18}{75}=.24$$

Therefore, if the internal gear torque is 210.5 units, the feed-back torque is 24% of 210.5 or 50.5 units, and the torque capacity of the fluid coupling C must be large enough to transmit about one-half engine torque. As soon as the speed ratio $$\frac{\text{Turbine 27}}{\text{Pump 12}} \text{ exceeds } \frac{38}{25}\times\frac{6}{19}=.480$$

the reaction sun gear 46 ceases its function of torque multiplication and it will begin to rotate forwardly.

However, 24% of the gross torque delivered to internal gear 32 will continue to be fed back to sun gear 23 and impeller 21 of fluid coupling C and hence to its runner 31 and be combined with the torque of turbine 27, the latter being derived from the pump torque amplified by stator 33, to compose the gross torque of internal gear 32.

Conversely, if the feed-back torque is 24% of the internal gear torque then the latter must be $$\frac{100}{76}=1.316 \text{ times the torque of turbine 27}$$

so that when the speed ratio $$\frac{\text{Turbine 27}}{\text{Pump 12}}=1 \text{ approximately}$$

then the torque of internal gear 32 will be 100 units of engine torque times 1.316 equal to 131.6 units, whereof 24% or 31.6 units will be fed back to sun gear 23 and fluid coupling C and 100 units of torque will be delivered to carrier 40 and output shaft 43.

When the speed ratio $$\frac{\text{Turbine } 27}{\text{Pump } 12} = .9$$

the torque multiplication ratio approaches unity, the circulating fluid of the converter will tend to rotate the stator forwardly and then the converter will operate as a fluid coupling with about 2% slip and then "direct drive" condition will have been attained.

| | Revolutions |
|---|---|
| (1) Drive shaft 10 and pump 12 | 1 |
| (2) First turbine 17 | 1 |
| (3) Second turbine 27 | .9800 |
| (4) Carrier 40 and shaft 43 | .9863 |
| (5) Reaction sun gear 46 | .9754 |

In "direct drive" ratio the efficiency of the transmission will be 98.63% for a 2% slip condition in the converter A and the fluid coupling C.

C. Pick-up or second gear operation

In order to pass another vehicle in traffic the brake 55 is applied whereby the engine may accelerate faster and the second turbine 27 and internal gear 32 will be able to deliver a greater torque to the driving wheels. Conversely, when descending a hill the momentum of the vehicle can be dissipated more effectively in the torque converter and fluid coupling when brake 55 is applied.

D. Hill holder or no-roll-back

As long as the brake bands 55 or 56 are in engagement with their respective brake drums the overrunning brake 45 prevents the vehicle from rolling backwardly when it comes to a halt on an incline. This hill holding device is a great convenience to the operator when he again wishes to move forwardly. Dextrous manipulation of the foot or emergency brake and accelerator is thereby eliminated. When the transmission is set in "neutral" or "reverse" operation reaction sun gear 46 will rotate reversely at a higher rate than carrier 40, therefore, the brake 45 becomes automatically ineffective.

E. Push starting the vehicle

Since overrunning brake 45 prevents reverse rotation of the carrier 40 relative to reaction sun gear 46, conversely, brake 45 prevents forward rotation of sun gear 46 relative to the carrier 40. When the vehicle is pushed a forward rotation of carrier 40 would take place.

Assuming that sun gear 23 would be stalled through its overrunning clutch connection 25 with the engine crank shaft 10 the planetary motion of pinions 42 and 41 would impart forward rotation to ring gear 32 and to reaction sun gear 46 as shown below:

| Carrier 40 | Internal gear 32 | Sun gear 46 | Sun gear 23 |
|---|---|---|---|
| Hold 0 | 1/−18/75 | 1/+18/39 | 1 |
| 1 | 57/75=.76 | 57/39=1.46 | 0 |

For each forward revolution of carrier 40 sun gear 46 would make 1.46 forward revolutions, if there were no brake 45 in the transmission, because the latter would prevent any forward rotation of sun gear 46 relative to carrier 40.

Now let us assume that the overrunning clutch 25 is omitted from the transmision and internal gear 32 remains stalled when carrier 40 rotates forwardly, then the planetary motion of pinions 41 and 42 would impart reverse rotation to sun gear 23 and forward rotation to reaction sun gear 46 as shown below:

| Carrier 40 | Sun gear 23 | Sun gear 46 | Internal gear 32 |
|---|---|---|---|
| Hold 0 | 1/−75/18 | 1/+75/39 | 1/−1 |
| 1 | −57/18=−3⅙ | 114/39=2.92 | 0 |

For each forward revolution of carrier 40 sun gear 46 would make 2.92 forward revolutions, if there were no brake 45, but the latter would prevent any forward rotation of sun gear 46 relative to carrier 40 if present in the transmission.

It has now been demonstrated that overrunning brake 45 is a valuable component of the transmission because it serves as a hill holder as well as making it possible to push start the engine without the otherwise necessary pump on the output shaft to supply pressure oil to the forward brake bands 55 or 56.

F. Reverse operation

For reverse operation of the transmission the brake band 54 is applied to the internal gear drum 32 and brake bands 55 and 56 are now in their released condition. Internal gear 32, as well as the connected turbines 27 and 31 will now be held stationary, and in accordance with the given gear data the driven shaft 43 will make 9/19 revolution reversely for one forward revolution of the drive shaft 10. However, its torque will be 3.67 to 7.34 times engine torque, depending on the speed ratio between the first turbine 17 and the pump 12 of the converter.

The reaction sun gear 46 makes 1 2/13 reverse revolution for one forward revolution of turbine 17 and its connected sun pinion 23. Since the reverse speed of rotation of sun gear 46 is almost 3 times faster than that of the driven shaft 43 the hill holding brake 45 will not interfere with reverse rotation of the driven shaft.

The design of the transmission illustrated in Figure 1 has now been described and its operation explained in detail and therefore it will be obvious that various modifications, rearrangements and minor improvements will suggest themselves to those skilled in the art. For example, the fluid coupling C may be positioned between the converter and the planetary gearing, or the band type brakes may be replaced with multiple plate or cone type brakes.

It should further be understood that the gear proportions used in describing the invention are subject to considerable variation to accommodate various operating conditions and such modifications and rearrangements shall come within the scope of the following claims.

I claim:

1. A variable speed and torque transmission comprising in combination, coaxial drive and driven shafts, a multiple element hydraulic torque converter, a fluid coupling and planetary gearing, said converter having a pump, first and second turbines, and a stator having one-way brake means thereon and interposed between said pump and said second turbine, said pump being connected to said drive shaft, said planetary gearing comprising a single carrier connected to said driven shaft, an internal gear, first and second sun gears, first planetary pinions on said carrier meshing with said internal gear and said second sun gear, second planetary pinions on said carrier meshing with said first sun gear and said first planetary pinions, brake means connnected to said second sun gear, said fluid coupling comprising an impeller and a runner, said impeller being connected to said first turbine and said first sun gear, said runner being connected to said second turbine and said internal gear.

2. A variable speed and torque transmission according to claim 1, including in addition thereto means for braking said internal gear and its connnected second turbine and runner, said means comprising a rotatable element on said internal gear and stationary engaging means in cooperating relation therewith, whereby reverse rotation of said carrier and its connected driven shaft will result when the brake means on said internal gear is engaged and the brake means on said second sun gear is released.

3. A variable speed and torque transmission as set forth in claim 1, including in addition thereto one-way clutch means between said drive shaft and said first sun gear and its connected first turbine and impeller, whereby torque may be transmitted from said first sun gear to said drive shaft.

4. A variable speed and torque transmission as set forth in claim 1, including in addition one-way brake means connected to said second sun gear.

5. A variable speed and torque transmission as set forth in claim 1, including in addition one-way clutch means between said carrier and said second sun gear, whereby reverse rotation of said carrier is prevented when said second sun gear is stationary.

6. A variable speed and torque transmission as set forth in claim 1, including in addition thereto one-way clutch means between said drive shaft and said first sun gear, and one-way clutch means between said carrier and said second sun gear, whereby forward torque may be transmitted from said driven shaft to said first sun gear and therefrom to said drive shaft.

7. A transmission comprising coaxial input and output shafts and torque multiplying means interposed between said shafts, including a hydrokinetic torque converter composed of a bladed pump, first and second turbines, a stator interposed between said pump and said second turbine, and interconnected planetary gearing comprising a plantary pinion carrier, a ring gear, first and second sun gears, first planetary pinions on said carrier meshing with said ring gear and said second sun gear, second planetary pinions on said carrier meshing with said first sun gear and said first planetary pinions, and a fluid coupling composed of an impeller and a runner, and control means including one-way brake means on said stator, brake means and one-way brake means on said second sun gear, said first turbine being connected to said impeller and said first sun gear, said second turbine being connected to said runner and to said ring gear, said pump being connected to said input shaft, and said carrier being connected to said output shaft, whereby torque applied at the ring gear is divided, a larger portion of said torque being transmitted to said carrier and output shaft and a smaller portion thereof being transmitted to said first sun gear and its connected impeller and fed back through said runner to said ring gear, the reaction torque imposed on said second sun gear being relieved and an approximately one-to-one transmission ratio is attained.

8. A transmission as set forth in claim 7, including in addition thereto one-way clutch means between said input shaft and said first sun gear and its connected first turbine and impeller, whereby torque may be transmitted from said first sun gear to said input shaft.

9. A transmission as set forth in claim 7, including in addition thereto one-way brake means between said carrier and said second sun gear, whereby reverse rotation of said carrier and its connected output shaft is prevented, when said second sun gear is held stationary.

10. A transmission as set forth in claim 7, including in addition thereto one-way clutch means between said input shaft and said first sun gear, and one-way clutch means between said carrier and said second sun gear, whereby forward torque may be transmitted from said output shaft to said first sun gear and therefrom to said input shaft.

11. A transmission as set forth in claim 7, including in addition thereto means for braking said second turbine and connected ring gear, whereby reverse rotation of said carrier and connected output shaft will occur when the brake means cooperating with said second sun gear are released.

12. In a variable speed mechanism for delivering uninterrupted torque from a drive shaft to a coaxial driven shaft, comprising in combination a multi-turbine hydraulic torque converter interconnected with a fluid coupling and planetary gearing, and control means, said torque converter comprising a pump connected to said drive shaft, first and second turbines, and a stator having one-way brake means thereon and positioned between said pump and said second turbine, said fluid coupling comprising an impeller and a runner, said planetary gearing comprising a ring gear, first and second sun gears and a carrier connected to said driven shaft, first planetary pinions on said carrier meshing with said ring gear and said second sun gear, second planetary pinions on said carrier and meshing with said first sun gear and said first planetary pinions, said first turbine being connected to the impeller of said fluid coupling and to said first sun gear, said second turbine being connected to the runner of said fluid coupling and to said ring gear, said control means comprising brake means and one-way brake means cooperating with said second sun gear, brake means cooperating with said ring gear, one-way clutch means between said first sun gear and said drive shaft for transmitting forward torque from said first sun gear to said drive shaft, one-way brake means between said carrier and said second sun gear for transmitting reverse torque from said carrier to said second sun gear, or conversely, for transmitting forward torque from said carrier to said first sun gear and to said drive shaft.

References Cited in the file of this patent

UNITED STATES PATENTS

| | | |
|---|---|---|
| 2,737,824 | Livermore | Mar. 13, 1956 |
| 2,737,827 | Seybold | Mar. 13, 1956 |
| 2,873,618 | De Lorean | Feb. 17, 1959 |
| 2,919,604 | De Lorean | Jan. 5, 1960 |
| 2,932,989 | Winchell | Apr. 19, 1960 |